United States Patent
Innocent (10) Patent No.: US 8,049,789 B2
(45) Date of Patent: Nov. 1, 2011

(54) WHITE BALANCE CORRECTION USING ILLUMINANT ESTIMATION

(75) Inventor: Manuel Innocent, Wezemaal (BE)

(73) Assignee: ON Semiconductor Trading, Ltd, Hamilton (BM)

( * ) Notice: Subject to any disclaimer, the term of this patent is extended or adjusted under 35 U.S.C. 154(b) by 831 days.

(21) Appl. No.: 11/639,772

(22) Filed: Dec. 15, 2006

(65) Prior Publication Data
US 2008/0143844 A1 Jun. 19, 2008

(51) Int. Cl.
*H04N 9/73* (2006.01)
(52) U.S. Cl. .................................................. 348/223.1
(58) Field of Classification Search .............. 348/223.1, 348/655
See application file for complete search history.

(56) References Cited

U.S. PATENT DOCUMENTS

| | | | | |
|---|---|---|---|---|
| 6,362,849 | B1 * | 3/2002 | Caisey-Bluteau et al. | 348/222.1 |
| 6,947,080 | B2 * | 9/2005 | Ikeda | 348/223.1 |
| 2002/0101516 | A1 * | 8/2002 | Ikeda | 348/223 |
| 2005/0088537 | A1 * | 4/2005 | Nakamura et al. | 348/223.1 |
| 2006/0098254 | A1 * | 5/2006 | Tokuhashi | 358/518 |
| 2007/0177032 | A1 * | 8/2007 | Wong | 348/223.1 |

OTHER PUBLICATIONS

Wikipedia, The Free Encyclopedia, "SRGB Color Space", http://en.wikipedia:org/wiki/SRGB_color_space, last modified Oct. 24, 2006, pp. 1-4.
Wikipedia, The Free Encyclopedia, "Luma (video)", http://en.wikipedia.org/wiki/Luma_%28video%29, last modified Sep. 10, 2006, pp. 1 total.
Wikipedia, The Free Encyclopedia, "Color Temperature", http://en.wikipedia.org/wiki/Color_temperature, last modified Nov. 13, 2006, pp. 1-6.
Wikipedia, The Free Encyclopedia, "Taxicab geometry", http://en.wikipedia.org/wiki/Manhattan_distance, last modified Oct. 12, 2006, pp. 1-2.

* cited by examiner

*Primary Examiner* — David Ometz
*Assistant Examiner* — Akshay Trehan
(74) *Attorney, Agent, or Firm* — Rennie William Dover (57) ABSTRACT

A method and apparatus for white balance correction using illuminant estimation includes calculating a weighted average of the color coordinates of points in a color image to determine an estimated illuminant of the color image in the color space of an image sensor and selecting white balance correction factors for the color image using the estimated illuminant of the color image and color coordinates of one or more of a number of reference illuminant points in the color space of the image sensor.

20 Claims, 9 Drawing Sheets

WHITE BALANCE CORRECTION USING ILLUMINANT ESTIMATION

TECHNICAL FIELD

The present invention is related to the field of digital imaging and, more particularly, to the correction of white balance in digital color images.

BACKGROUND

Solid-state image sensors have found widespread use in cameras and imaging systems. Some solid-state image sensors are composed of a matrix of photosensitive elements in series with amplifying and switching components. The photosensitive elements may be, for example, photo-diodes, phototransistors, photo-gates or the like. Typically, an image is focused on an array of picture elements (pixels) containing photosensitive elements, such that each photosensitive element in the array of pixels receives electromagnetic energy from a portion of the focused image. Each photosensitive element converts a portion of the electromagnetic energy it receives into electron-hole pairs and produces a charge or current that is proportional to the intensity of the electromagnetic energy it receives.

Solid-state image sensors may be fabricated using several different device technologies, including CCD (charge-coupled device) technology and MOS (metal-oxide semiconductor) and/or CMOS (complementary metal-oxide semiconductor) technologies. Typically, these technologies are silicon based. However, other material systems, such as III-V or II-VI compound semiconductor systems may be used, depending on the specific imaging application and/or portion of the electromagnetic spectrum to be imaged (e.g., visible light photography, ultraviolet imaging, infrared imaging, etc.).

The pixels in silicon-based image sensors that are used for light photography are inherently panchromatic. They respond to a range of electromagnetic wavelengths that include the entire visible spectrum as well as portions of the infrared and ultraviolet bands. To produce a color image, a color filter array (CFA) can be located in front of the pixel array. Typically, the CFA consists of an array of red (R), green (G) and blue (B) polymer filters deposited on top of the pixel array, with one filter covering each pixel in the pixel array in a prescribed pattern. The polymer color filter over each pixel passes a limited range of electromagnetic wavelengths (e.g., red or green or blue) and reflects and/or absorbs other wavelengths. CFA's can also be made with complementary color filters such as cyan, magenta and yellow, or any other color system. However, the RGB system is used in the majority of color imaging systems.

The apparent color of an object depends on the color of the light that illuminates the object. If the source of the illumination (the illuminant) is not white, then the object will have a color cast that reflects the color of the illuminant. In photography, white balance is the process of removing unrealistic color casts arising from different lighting conditions so that a white object appears white in photographs of the object. If the white balance is correct, then all of the other colors in the photograph are rendered more accurately.

Illuminants are characterized by their "correlated color temperature." Color temperature describes the spectrum of light that a black body emits at that surface temperature (a black body is an idealized absorber/radiator of electromagnetic energy). The light emitted from a black body appears white to the human eye at approximately 6500 degrees Kelvin. At lower temperatures, the black body spectrum shifts toward the red end of the visible spectrum. At higher temperatures, the black body spectrum shifts toward the blue end of the visible spectrum. The correlated color temperature of an illuminant is the color temperature of a black body with the same (or approximately the same) apparent color as the illuminant. For example, daylight (clear day with the sun overhead) has a correlated color temperature in the range of 5000-6500 Kelvin, candlelight has a correlated color temperature in the range of 1000-2000 Kelvin and fluorescent light has a correlated color temperature in the range of 4000-5000 Kelvin.

As noted above, digital cameras typically utilize arrays of red, green and blue pixels to capture the colors of an image (where the red/green/blue ratio determines the apparent color). In digital photography, the current industry standard for white balance in low-end cameras is the well known "grey world" algorithm. This algorithm assumes that, on average, a scene will contain equal amounts of red, green and blue, so that that the average color of the scene is grey. Correction factors for red, green and blue are calculated such that this assumption is imposed on the image. Although this is a very simple algorithm, and leads to reasonably good results on most scenes, the algorithm fails completely on scenes with a dominant color like a blue sky, green grass or skin in a close up portrait because the average color in these cases is far from grey.

BRIEF DESCRIPTION OF THE DRAWINGS

The present invention is illustrated by way of example, and not by way of limitation, in the figures of the accompanying drawings, in which.

DETAILED DESCRIPTION

In the following description, numerous specific details are set forth, such as examples of specific components, structures, etc., in order to provide a thorough understanding of embodiments of the present invention. It will be apparent, however, to one skilled in the art that embodiments of present invention may be practiced without these specific details. In other instances, well known components or methods have not been described in detail in order to avoid unnecessarily obscuring the present invention. Thus, the specific details set forth are merely exemplary. The specific details may be varied from and still be contemplated to be within the spirit and scope of the present invention.

Embodiments of the present invention may include circuits which perform operations. Alternatively, the operations of the present invention may be embodied in machine-executable instructions, which may be used to cause a general-purpose or special-purpose processing device programmed with the instructions to perform the operations. Alternatively, the operations maybe performed by a combination of hardware and software.

Embodiments of the present invention may be provided as a computer program product, or software, that may include a machine-readable medium having instructions stored thereon, which may be used to program a computer system (or other electronic devices) to perform a process according to the present invention. A machine readable medium includes any mechanism for storing or transmitting information in a form (e.g., software, processing application) readable by a machine (e.g., a computer). The machine readable medium may include, but is not limited to: magnetic storage media (e.g., floppy diskette); optical storage media (e.g., CD-ROM); magneto-optical storage media; read only memory (ROM); random access memory (RAM); erasable programmable memory (e.g., EPROM and EEPROM); flash memory; electrical, optical, acoustical or other form of propagated signal; (e.g., carrier waves, infrared signals, digital signals, etc.); or other type of medium suitable for storing electronic instructions.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters or the like.

It will be appreciated that throughout the following descriptions, terms such as "processing," calculating," "computing," "determining" or the like may refer to the actions and processes of a computer system or similar electronic computing device that manipulates and transforms data represented as physical (e.g., electronic) quantities within the computer systems registers and memories into other data similarly represented as physical quantities within the computer system.

Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines, and each of the single signal lines may alternatively be buses.

Figure 1:
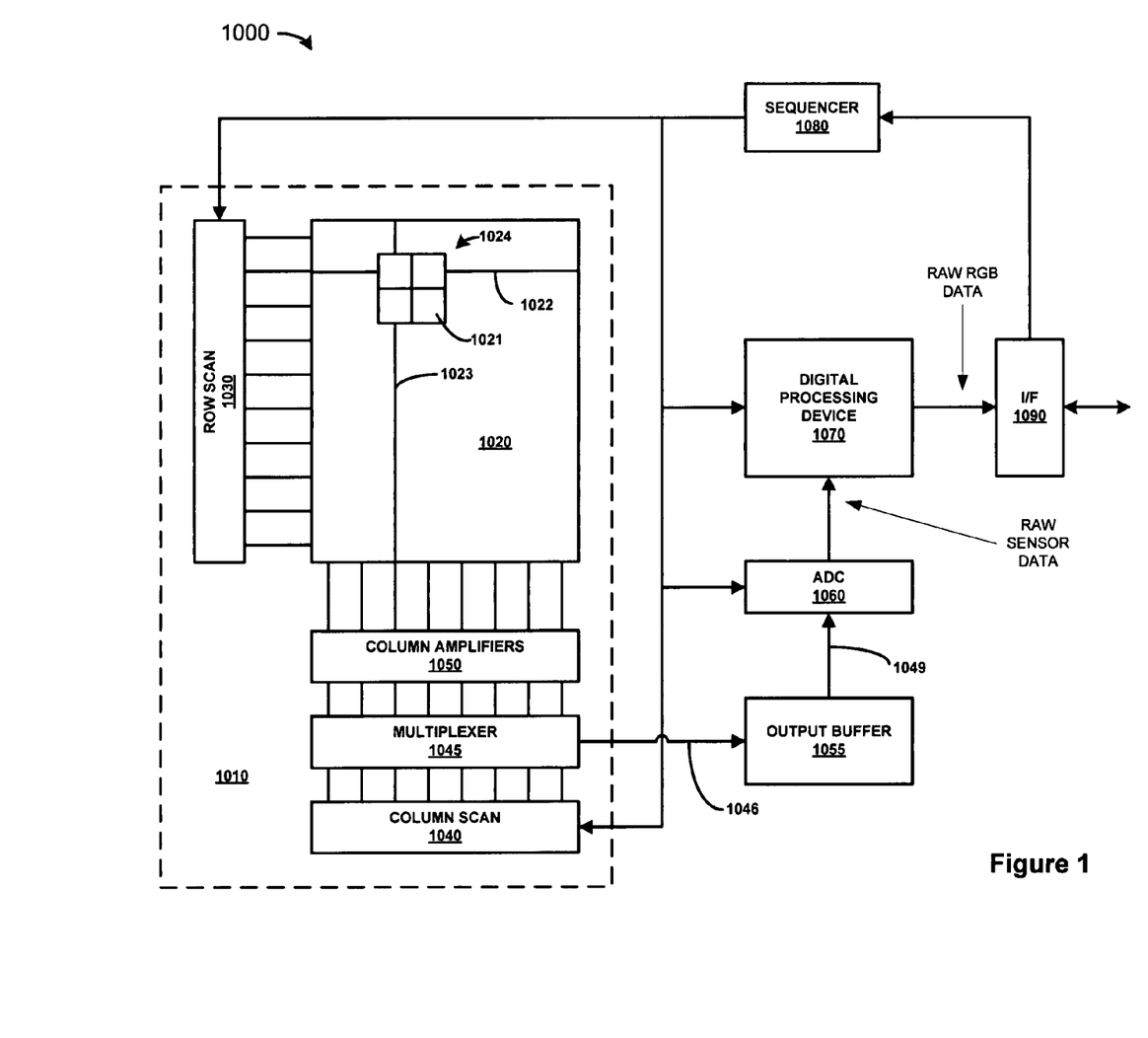
FIG. 1 illustrates a system in which embodiments of the invention may be implemented.

FIG. 1 illustrates an image sensor 1000 in which embodiments of the present invention may be implemented. Image sensor 1000 includes a pixel array 1020 and electronic components associated with the operation of an imaging core 1010. In one embodiment, the imaging core 1010 includes a pixel matrix 1020 having an array of color pixels (e.g., pixel 1021), grouped into color cells (e.g., color cell 1024) and the corresponding driving and sensing circuitry for the pixel matrix 1020. The driving and sensing circuitry may include: one or more row scanning registers 1030 and one or more column scanning registers 1040 in the form of shift registers or addressing registers, for example; column amplifiers 1050 that may also contain fixed pattern noise (FPN) cancellation and correlated double sampling circuitry; and an analog multiplexer 1045 coupled to an output bus 1046.

The pixel matrix 1020 may be arranged in rows and columns of pixels. Each pixel (e.g., pixel 1021) is composed of at least a color filter (e.g., red, green or blue), a photosensitive element and a readout switch (not shown). Pixels in pixel matrix 1020 may be grouped in color patterns to produce color component signals (e.g., RGB signals) which may be processed together as a color cell (e.g., color cell 1024).

The row scanning register(s) 1030 addresses all pixels of a row (e.g., row 1022) of the pixel matrix 1020 to be read out, whereby all selected switching elements of pixels of the selected row are closed at the same time. Therefore, each of the selected pixels places a signal on a vertical output line (e.g., line 1023), where it is amplified in the column amplifiers 1050. Column amplifiers 1050 may be, for example, transimpedance amplifiers to convert charge to voltage. In one embodiment, column scanning register(s) 1040 provides control signals to the analog multiplexer 1045 to place an output signal of the column amplifiers 1050 onto output bus 1046 in a column serial sequence. Alternatively, column scanning register 1040 may provide control signals to the analog multiplexer 1045 to place more than one output signal of the column amplifiers 1050 onto the output bus 1046 in a column parallel sequence. The output bus 1046 may be coupled to an output buffer 1055 that provides an analog output 1049 from the imaging core 1010. Buffer 1055 may also represent an amplifier if an amplified output signal from imaging core 1010 is desired.

The output 1049 from the imaging core 1010 is coupled to an analog-to-digital converter (ADC) 1060 to convert the analog imaging core output 1049 into the digital domain. The ADC 1060 is coupled to a digital processing device 1070 to process the digital data received from the ADC 1060. Digital processing device 1070 may be one or more general-purpose processing devices such as a microprocessor or central processing unit, a controller, or the like. Alternatively, digital processing device 1070 may include one or more special-purpose processing devices such as a digital signal processor (DSP), an application specific integrated circuit (ASIC), a field programmable gate array (FPGA), or the like. Digital processing device 1070 may also include any combination of a general-purpose processing device and a special-purpose processing device and may also include memory for storing data and/or instructions. In one embodiment, digital processing device 1070 may be configured to perform one or more aspects of the white balance operations described herein.

The digital processing device 1070 may be coupled to an interface module 1090 that handles the information input/output exchange with components external to the image sensor 1000 and takes care of other tasks such as protocols, handshaking, voltage conversions, etc. The interface module 1090 may be coupled to a sequencer 1080. The sequencer 1080 may be coupled to one or more components in the image sensor 1000 such as the imaging core 1010, digital processing device 1070, and ADC 1060. The sequencer 1080 may be a digital circuit that receives externally generated clock and control signals from the interface module 1090 and generates internal pulses to drive circuitry in the imaging sensor (e.g., the imaging core 1010, ADC 1060, etc.).

The image sensor 1000 may be fabricated on one or more common integrated circuit die that may be packaged in a common carrier. In one embodiment, one or more of digital processing device 1070 are disposed on the integrated circuit die outside the imaging area (i.e., pixel matrix 1020) on one or more integrated circuit die of the image sensor 1000. In one embodiment, some or all of the analog and digital components of image sensor 1000 may be integrated in one or more analog/digital mixed signal ASIC devices.

In the following description, embodiments of the invention are discussed in terms of a red-green-blue (RGB) color system for clarity and ease of discussion. It will be appreciated that other embodiments of the invention may be implemented using other color systems as are known in the art.

Figure 2:
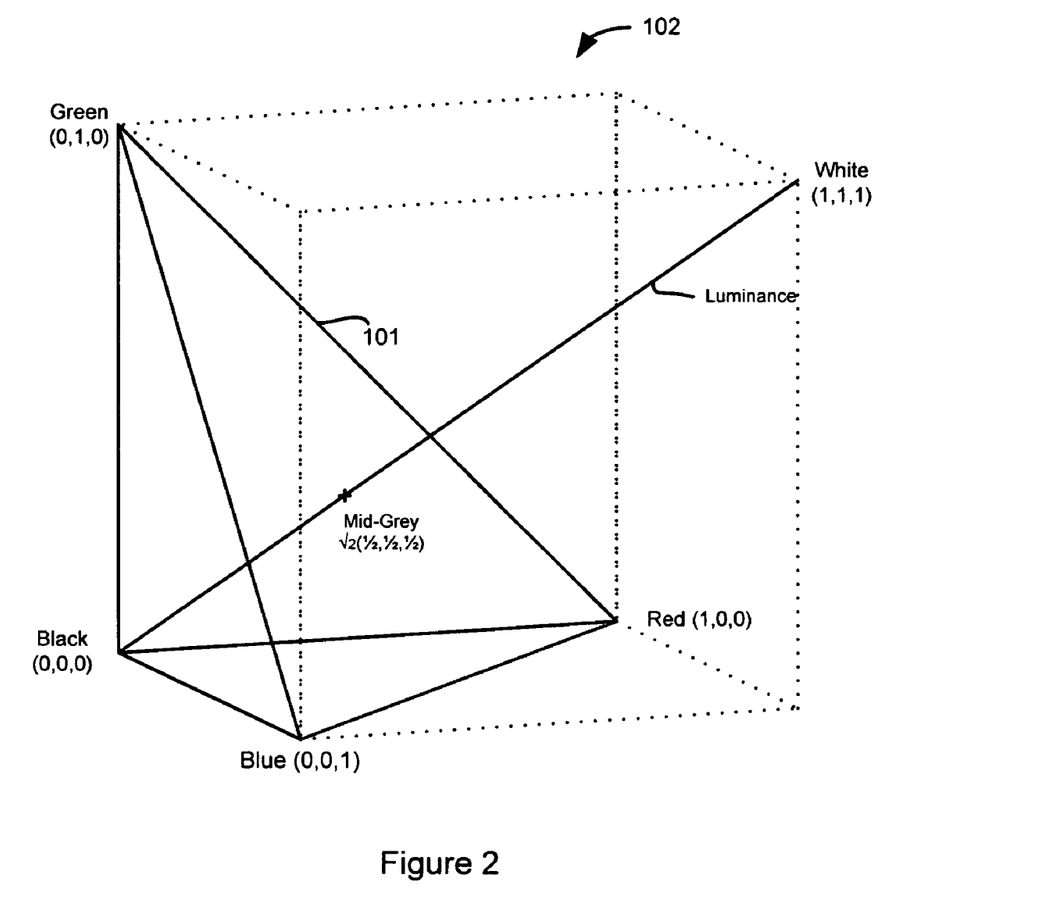
FIG. 2 illustrates a 3-dimensional color space in one embodiment.

Embodiments of the present invention are described herein with respect to the "color triangle." The color triangle is a two-dimensional equilateral triangle in a red-green-blue (RGB) primary color data space that provides information about the color of an RGB triplet (i.e., a location in the RGB color space corresponding to a particular ratio of red to green to blue) and not about the brightness (luminance) of the RGB triplet. FIG. 2 illustrates a color triangle 101 in a three dimensional RGB color space 102. The vertices of the triangle intersect R, G and B axes of the RGB color space at their unity values. Any color point in the RGB space 102 can be projected onto the color triangle 101 by a line from the origin to the color point. The projected point retains information about the relative amounts of red, green and blue in the color point.

Any RGB point in the color triangle can be normalized, such that $R_n + G_n + B_n = 1$. The normalization can be performed by a matrix operation as shown by equation (1).

$$\begin{bmatrix} R_n \\ G_n \\ B_n \end{bmatrix} = \begin{bmatrix} R \\ G \\ B \end{bmatrix} \cdot [1/(R+G+B)] \quad (1)$$

The color triangle can be transformed from the three-dimensional RGB space to a two-dimensional space by a linear matrix operation given by:

$$\begin{bmatrix} C_X \\ C_Y \end{bmatrix} = \begin{bmatrix} \cos(\pi/6) & \cos(\pi/2) & \cos(-5*\pi/6) \\ \sin(-\pi/6) & \sin(\pi/2) & \sin(-5*\pi/6) \end{bmatrix} \cdot \begin{bmatrix} R_n \\ G_n \\ B_n \end{bmatrix} \quad (2)$$

Figure 3:
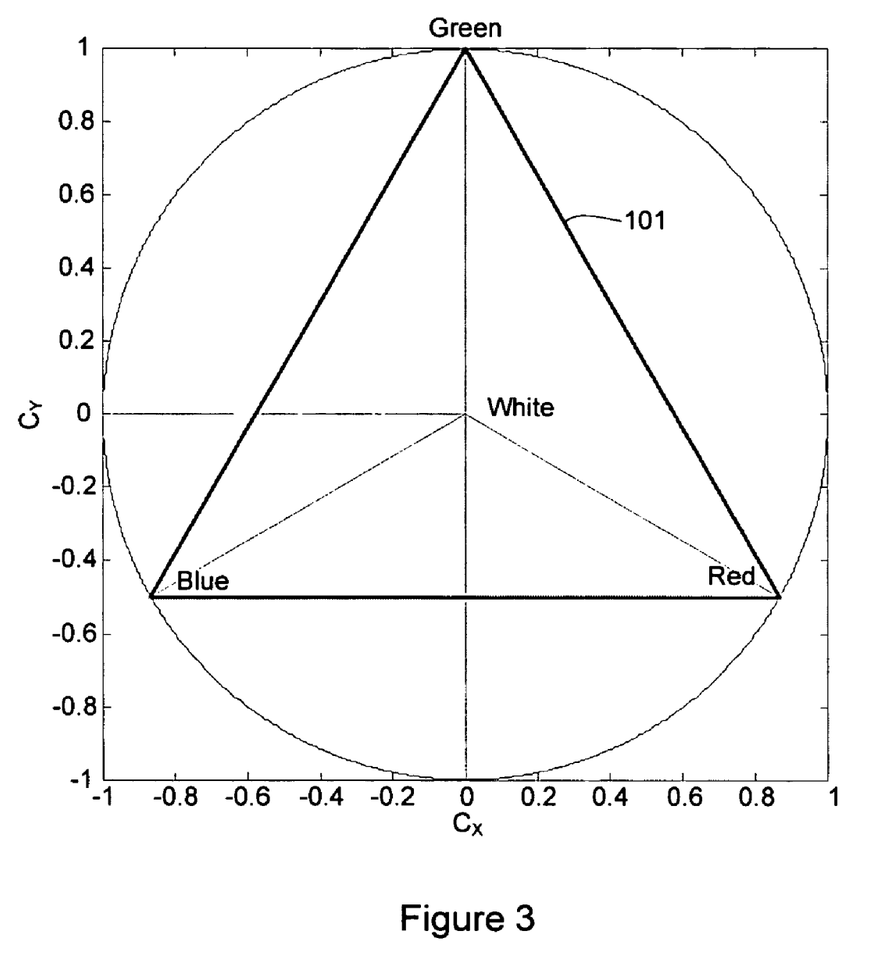
FIG. 3 illustrates a 2-dimensional color triangle in one embodiment.

As illustrated in FIG. 3, this operation preserves the shape of the triangle 101 and brings the center of the triangle ($C_X=0$, $C_Y=0$) to the origin of the RGB axes (the coordinates in FIG. 3 are arbitrary). The color triangle in FIG. 3 is the color triangle that is referred to in this description unless noted otherwise.

Figure 4A:
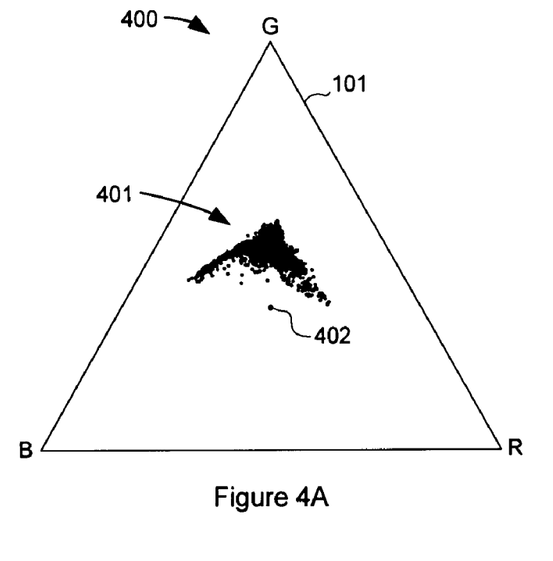
FIG. 4A illustrates the color space of an image sensor in one embodiment.

As noted above, each pixel in a color image sensor receives light through a color filter (e.g., a red, green or blue color filter in the case of an RGB color system). The output of each pixel can be mapped to the color triangle to show the distribution of color in the color space of the image sensor. As used herein, the color space of the image sensor means the raw, uncorrected color response of the image sensor, which may have errors or biases due to fabrication and/or processing variables such as pixel response variations, color filter misalignment, variations in filter transmission coefficients or the like. FIG. 4A illustrates the color space 400 of an image sensor. In FIG. 4A, the locus of color points 401 in the color triangle 101 corresponds to one frame (i.e., all of the pixels) of an exemplary pixel array such as pixel array 1020. The distribution of the color points 401 depends on the color space of the image sensor, the colors in the scene being imaged and the color of the illuminant (illumination source).

Without additional information, there is no way to determine if the locus of points 401 represents the actual color distribution in the scene (i.e., that the white balance is correct). Conventionally, the "grey world" assumption would be used to compute the unweighted center of gravity (i.e., simple average position) of the locus 401 and to move the center of gravity of the locus to the center 402 of the color space 400 of the image sensor. As noted above, this approach assumes that the average color of the scene is grey (i.e., that R=G=B). If the assumption is wrong, then the resulting image will have false colors.

In one embodiment of the present invention, as described in detail below, the white balance of the color image represented by the locus of points 401 may be corrected by calibrating the color space 400 of the image sensor with a set of reference illuminants, using a weighted average of the color coordinates of the locus 401 to estimate the illuminant of the color image and applying correction factors to the locus 401 based on the estimated illuminant.

Figure 4B:
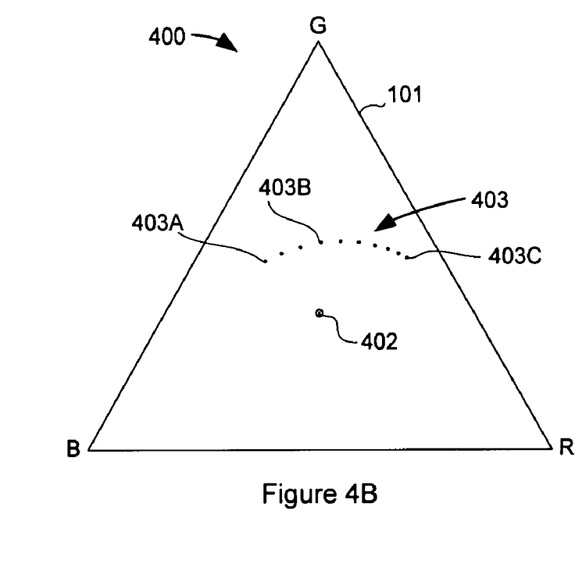
FIG. 4B illustrates reference illuminant calibration points in the color space of an image sensor in one embodiment.

FIG. 4B illustrates a set of calibration points 403 in the color space 400 representing the response of an image sensor when a uniformly white scene is illuminated with a set of illuminants having different color temperatures. For example, point 403A may correspond to an illuminant with a color temperature of 10,000 K, point 403B may correspond to an illuminant with a color temperature of 6,500 K and point 403C may correspond to an illuminant with a color temperature of 3,000 K. Point 402 is the target point for white-balanced data in the color space of the image sensor. Points 403 may be acquired by actually illuminating a white field with light sources of the correct color temperatures and measuring the output of the image sensor. Alternatively, one reference illuminant may be used to generate one calibration point and the rest of the calibration points may be calculated using Plank's equation for black body radiation.

Planck's equation provides the radiation density per unit wavelength for a black body at temperature T in units of Joules per cubic meter per meter.

$$S_\lambda = \frac{8\pi hc}{\lambda^5} \frac{1}{e^{hc/\lambda kT} - 1} \text{ where} \quad (3)$$

Figure 5:
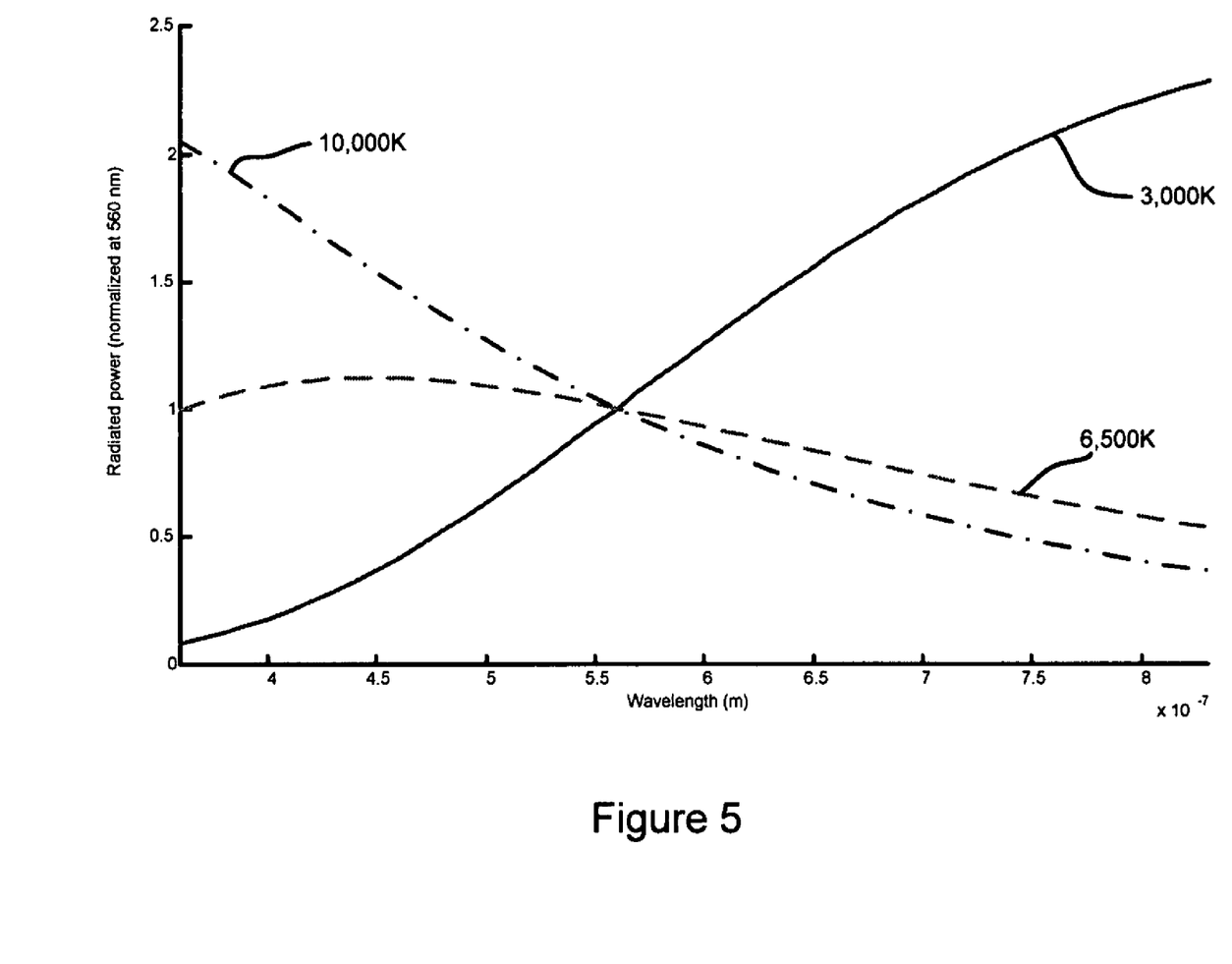
FIG. 5 illustrates an example of black body radiation.

$c = 2.998*10^8$ meter/sec    Speed of light $h = 6.6261*10^{-34}$ Joule-sec    Planck's constant $k = 1.380*10^{-23}$ Joule/K    Boltzmann's constant The radiated power per unit area per unit wavelength is obtained by multiplying the energy density by c/4. FIG. 5 illustrates the normalized radiated power for a black body at 3000K, 6500K and 10000K. It can be seen that as temperature increases, the relative contribution of short wavelengths (blue light) increases and that of longer wavelengths (red light) decreases.

Irrespective of how the reference illuminant points 403 are acquired (i.e., experimentally or theoretically), they may be stored (described in greater detail below) for comparison with the locus of points 401 of a color image in the color space of an image sensor.

As noted above, the color temperature of the light source illuminating a scene may be estimated from the incoming image data based on a weighted center of gravity (weighted average) of the RGB coordinates of the points in the image. In contrast to the "grey world" assumption, where every point in the locus of points 401 has equal weight, embodiments of the present invention assign higher weight to points in the locus of points 401 that are "possibly white" points. Possibly white points are points having a color that could have been reflected from a white object illuminated by one of the reference illuminants. As such, these points are expected to carry more information about the color temperature of the illuminant than other points. A weighted average biased toward possibly white points has an advantage over a plain average in that it reduces the influence of clearly non-white points (e.g., saturated colors and/or dominant colors) on the estimate of the color temperature of the illuminant. It will be appreciated that "possibly white" refers to color balance (e.g., R=G=B) and not to intensity. Therefore, possibly white points may include all grey scale possibilities from black to white, depending on the intensity of the ambient illumination. A point is considered to be possibly white when its RGB coordinates in the color space of the image sensor (i.e., the sensor's color triangle) are located in a region around the RGB coordinates of a set of reference illuminants mapped into the same color space during a calibration process.

Possibly white points may be determined by calculating distances from each of the reference illuminant points 403 to each of the locus of points 401 and weighting those points in the locus of points 401 that are within a specified distance to one of the reference illuminant points 403. Alternatively, a region may be defined around each of the reference illuminant points 403 such that the regions overlap and form a contiguous region. Then, any point in the locus of points 401 that falls within the contiguous region may be identified as a possibly white point and weighted accordingly.

A spherical region around a point in the RGB color space is defined by a circle in the RGB color triangle (i.e., the circle is defined by the intersection of the sphere and the plane of the triangle). The radius of the circle in the plane of the color triangle is given by equation 4 where all RGB coordinates are normalized, as described above, to ensure that the points are in the plane of the color triangle. The coordinates indicated with subscript R denote the reference point or the center of the circle.

$$\text{Radius} = \sqrt{(R_n - R_{Rn})^2 + (G_n - G_{Rn})^2 + (B_n - B_{Rn})^2} \quad (4)$$

$$R_n + G_n + B_n = 1$$

$$R_{Rn} + G_{Rn} + B_{Rn} = 1$$

When the normalization is written explicitly this leads to equation (5):

$$\text{Radius} = \quad (5)$$

$$\sqrt{\left(\frac{R}{T+G+B} - \frac{R_R}{R_R+G_R+B_R}\right)^2 + \left(\frac{G}{R+G+B} - \frac{G_R}{R_R+G_R+B_R}\right)^2 + \left(\frac{B}{R+G+B} - \frac{B_R}{R_R+G_R+B_R}\right)^2}$$

When one of the color coordinates of a reference point ($R_R$, $G_R$ and $B_R$) is dominant, the normalization can be approximated by dividing only by the dominant color component. For example, if the dominant color is green, the normalization equation may be simplified as shown in equation (6).

$$\text{Radius} = \sqrt{\left(\frac{R}{G} - \frac{R_R}{G_R}\right)^2 + \left(\frac{G}{G} - \frac{G_R}{G_R}\right)^2 + \left(\frac{B}{G} - \frac{B_R}{G_R}\right)^2} \quad (6)$$

Or after further simplification and approximating $G_R$ by 1 (if G is dominant):

$$\text{Radius} = \sqrt{\left(\frac{R}{G} - \frac{R_R}{1}\right)^2 + \left(\frac{B}{G} - \frac{B_R}{1}\right)^2} \quad (7)$$

The next step in the simplification of the expression is changing the Euclidian distance into a Manhattan distance (also known as taxicab distance, Manhattan distance is the distance between two points in a regular grid when the path between the points is constrained to a sequence of horizontal and vertical moves, like a taxicab on the streets of Manhattan). This changes the shape of the regions around the center from circles to diamonds.

$$\text{Radius} = \left|\frac{R}{G} - \frac{R_R}{1}\right| + \left|\frac{B}{G} - \frac{B_R}{1}\right| \quad (8)$$

Rewriting this equation yields:

$$\text{Radius} * G = R_R \left|\frac{R}{R_R} - G\right| + B_R \left|\frac{B}{B_R} - G\right| \quad (9)$$

The last approximation (equation 9) takes the factors $R_R$ and $B_R$ outside the absolute value brackets. This changes both the size and the shape of the region, but it also makes it possible to implement the equation with very little hardware, as described below. It will be appreciated that the coordinates ($R_R$, $G_R$ and $B_R$) of each illuminant reference point may be expressed as the reciprocal of correction factors that move the illuminant reference point to the reference white point in the center of the color triangle. That is:

$$R_R = \frac{1}{\text{red\_cor\_factor}} \quad (10)$$

$$G_R = \frac{1}{\text{green\_cor\_factor}}$$

-continued $$B_R = \frac{1}{\text{blue\_cor\_factor}}$$

Substituting equations (10) into equation (9) yields:

$$|R*\text{red\_cor\_factor} - G| + |B*\text{blue\_cor\_factor} - G| < \text{radius}*G \quad (11)$$

Equation (11) assumes, as above, that green is the dominant color and has the smallest correction factor, which has become 1 after normalization. This is not a limitation on the generality of the method because the colors may be exchanged in the equation if another color has the smallest correction factor. The normalization and exchange of colors in the equation may be performed for each reference illuminant individually. In one embodiment, as described below, the weighted center of gravity of the locus of points 401 of the color image may be used as an entry point to a lookup table that holds the correction factors for each reference illuminant. The correction factors for the reference illuminant point that is closest to the weighted center of gravity may then be used to correct the locations of all of the points in the locus of points 401 of the color image.

Figure 6:
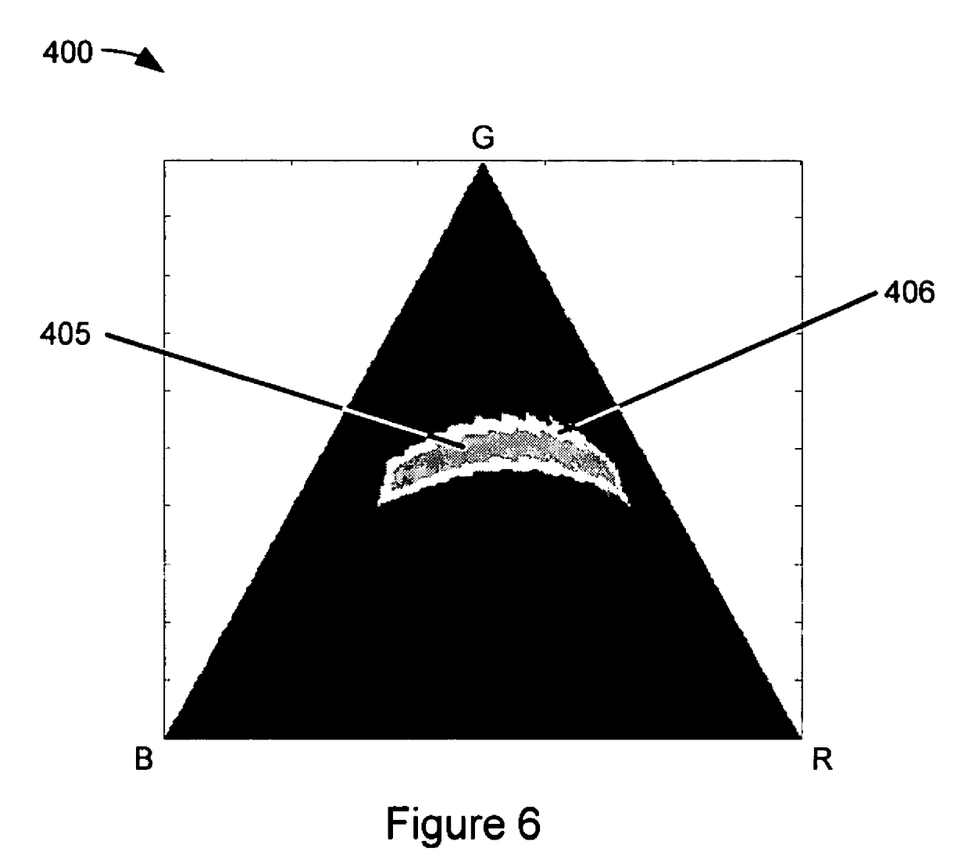
FIG. 6 illustrates regions of possibly white points in the color space of an image sensor in one embodiment.

FIG. 6 illustrates a region 405 of possibly white points in the color triangle 400 when the regions around each reference illuminant point are made large enough so that the individual areas around the illuminant points merge into one contiguous area. Any point in the locus of points 401 that falls within region 405 will be considered "possibly white" and weighted accordingly. One or more additional regions, such as region 406 in FIG. 6, may also be defined to provide one or more intermediate weights for points that are somewhere between "possibly white" and clearly non-white. The weighted center of gravity of the locus of points 401 may then be used to estimate the illuminant of the image.

The coordinates of the weighted center of gravity of the color image may be expressed as:

$$R_{WC} = \sum_{all\ pix} \alpha_{pix} R_{pix} \Big/ \sum_{all\ pixels} \alpha_{pix} \quad (12)$$

$$G_{WC} = \sum_{all\ pix} \alpha_{pix} G_{pix} \Big/ \sum_{all\ pixels} \alpha_{pix}$$

$$B_{WC} = \sum_{all\ pix} \alpha_{pix} B_{pix} \Big/ \sum_{all\ pixels} \alpha_{pix}$$

$$\alpha_{pix} = f(\min\ dist(pix,\ ref\ illuminant))$$

where $\alpha_{pix} = f(\min\ dist(pix, ref\ illuminant))$ is the weighting factor for each point in the locus of points 401, expressed as a function of the minimum distance from the point to a reference illuminant point (where weight increases with decreasing distance).

The color temperature of the scene may be estimated by projecting the weighted center of gravity ($R_{WC}, G_{WC}, B_{WC}$) onto a curve in the color triangle (illuminant curve) defined by the reference illuminant points 403. The intersection of the projection and the illuminant curve then yields the most likely color temperature for the scene. In general, the weighted center of gravity will not lie on the illuminant curve. However, the weighted center of gravity may be used to define a line that does intersect the illuminant curve, as illustrated in FIG. 7.

Figure 7:
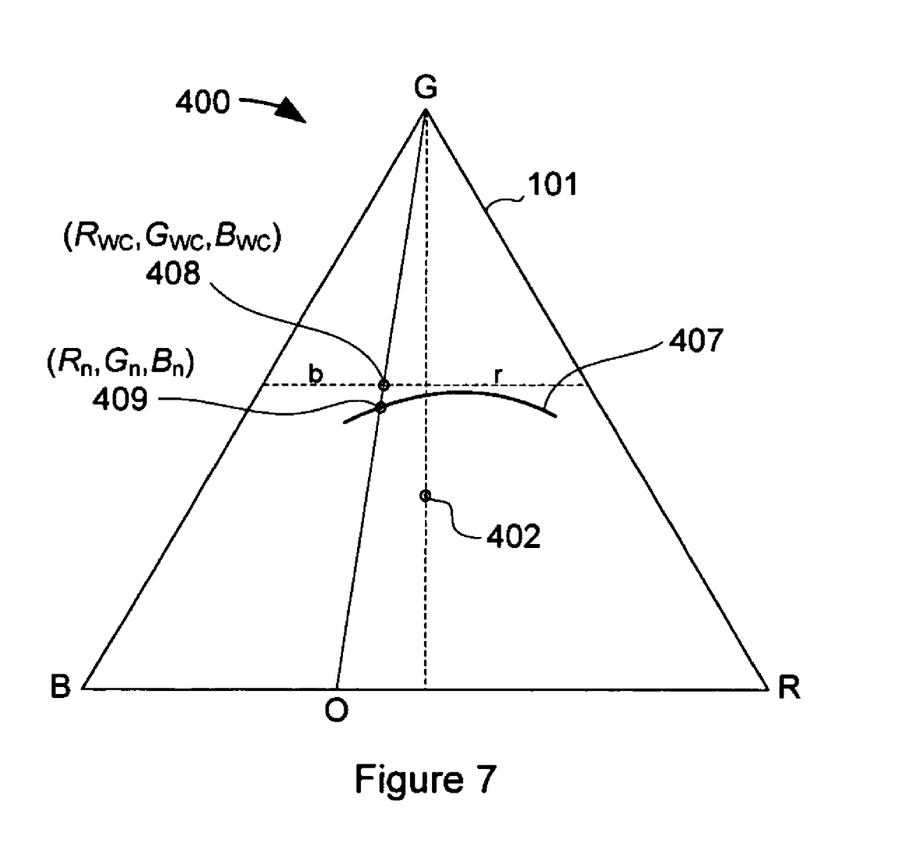
FIG. 7 illustrates the projection of a weighted center of gravity of a color image onto an illuminant calibration curve in the color space of an image sensor in one embodiment.

In FIG. 7, the illuminant curve 407 represents a continuous range of reference illuminants based on the reference illuminant points 403 (fitting a curve to a distribution of points is known in the art). Point 408 is the weighted center of gravity ($R_{WC}, G_{WC}, B_{WC}$) of the locus of points 401 of the color image. Line OG is a line projected from the green corner of the color triangle 101 through the weighted center of gravity 408 of the color image. It will be appreciated from basic trigonometry (theory of similar triangles) that any point on line OG will have the same blue/red ratio (e.g., the ratio of line segment b to line segment r is the same as the ratio of line segment BO to line segment OR). In particular, the blue/red ratio of point 408 will be the same as the blue/red ratio of point 409 where the line GO intersects the illuminant curve 407. The blue/red ratio is the ratio that has the highest sensitivity to color temperature. Therefore, the best estimate of the color temperature of the illuminant of the image (represented by the locus of points 401) is provided by point 409 on the reference illuminant curve 407.

It will be appreciated that because the red, green and blue coordinate spaces are orthogonal, it is only necessary to calculate the weighted center of gravity of the color image in the red-blue color space in order to determine the point 409. The weighted blue/red ratio of the scene, which is an indicator of color temperature, may be used as entry point for a look-up table that contains the correction factors for the reference illuminants, as described above. The final correction factors may be calculated by linear interpolation between the two closest entries in the table, yielding three correction factors; one for each color.

The application of the calculated white balance correction factors to the image may be performed in a straight forward operation. Each color component of each raw image data point is multiplied with its respective correction factor to obtain a white-balanced color component for that data point.

$$R_{WB} = R_{RAW} * cor\_fact\_R$$

$$G_{WB} = G_{RAW} * cor\_fact\_G$$

$$B_{WB} = B_{RAW} * cor\_fact\_B \quad (13)$$

Figure 8:
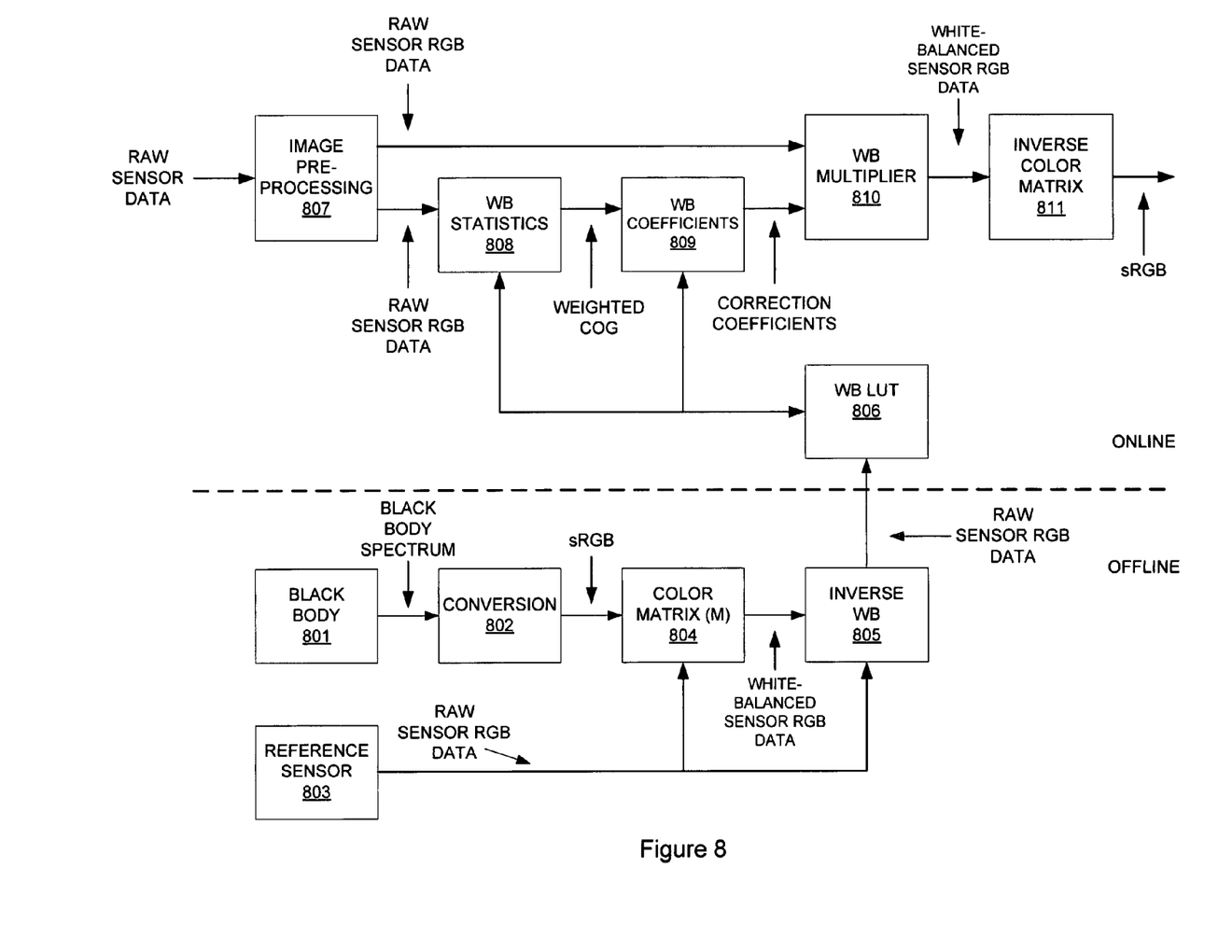
FIG. 8 illustrates a functional block diagram of a system for white balance correction in one embodiment.

FIG. 8 illustrates a functional block diagram of a system 800 for white balance correction in one embodiment. System 800 includes an offline system for calibration and an online system for image capture and white balance correction.

The offline system may be used to generate a look-up table of reference illuminant correction factors. The offline system includes a black body source 801 which may be used to provide one or more reference illuminants. The spectra of other reference illuminants may be derived using Planck's equation as described above. The black body radiation spectrum is converted to one or more reference illuminants in a standardized RGB color space (sRGB). This conversion may be performed in two steps in conversion module 802.

In one embodiment, the first step converts the power spectrum of the black body radiation to standard CIE (International Commission on Illumination) XYZ chromaticity coordinates by convolving the black body spectrum with a color matching function (e.g., CIE 1964 color matching function). Color matching functions are based on the properties of the human eye of a "standard" observer. The next step converts the XYZ coordinates into sRGB coordinates. The transformation is known in the art and given by equation (14) below:

$$\begin{bmatrix} R_{sRGB} \\ G_{sRGB} \\ B_{sRGB} \end{bmatrix} = \begin{bmatrix} +3.240479 & -1.537150 & -0.498535 \\ -0.969256 & +1.875992 & +0.041556 \\ +0.055648 & -0.204043 & +1.057311 \end{bmatrix} \cdot \begin{bmatrix} X \\ Y \\ Z \end{bmatrix} \quad (14)$$

Next, in color matrix 804, the black body sRGB data is balanced with respect to the response of a reference image sensor 803. This transforms the black body reference illuminants from sRGB to the RGB color space of the reference sensor 803. To obtain the transformation parameters, the reference sensor is used to capture an image of a known subject illuminated by a light source of known color temperature. The subject may be, for example, a Macbeth color checker as is known in the art, which has published sRGB coordinates for various colors. The light source may be, for example, a D65 standard light source having a correlated color temperature of 6500K, which is also the white point of the sRGB color space.

The transformation between the sRGB coordinates of the reference illuminants and the raw RGB output of the reference sensor may be expressed as a 3×3 matrix M as shown in equation (15):

$$\begin{bmatrix} R_{rawRGB} \\ G_{rawRGB} \\ B_{rawRGB} \end{bmatrix} = [M] \cdot \begin{bmatrix} R_{sRGB} \\ G_{sRGB} \\ B_{sRGB} \end{bmatrix} \quad (15)$$

The matrix M may be found as the least squares solution of the over determined system of equations relating the captured raw sensor RGB coordinates with the theoretical sRGB coordinates of the different patches of the Macbeth color checker. The resulting matrix M projects the sRGB coordinates of the black body of the same color temperature as the illuminant onto the raw sensor RGB coordinates of the illuminant captured by the sensor. Application of the matrix M to the sRGB data generates white-balanced reference illuminants in the color space of the reference sensor.

The next calibration step, performed by inverse white balance block 805, is the generation of white balance correction factors in the RGB color space of the sensor for illuminants of different color temperature T according to:

$$\begin{bmatrix} 1/\text{cor\_fact\_R}(T) \\ 1/\text{cor\_fact\_G}(T) \\ 1/\text{cor\_fact\_B}(T) \end{bmatrix} = [M] \cdot \begin{bmatrix} R_{BB(T),sRGB} \\ G_{BB(T),sRGB} \\ B_{BB(T),sRGB} \end{bmatrix} \quad (16)$$

where $X_{BB(T),sRGB}$ is the color component of the black body at temperature T in the sRGB color space and $1/\text{cor\_fact\_X}(T)$ is the corresponding correction factor. The correction factors are stored in look-up table 806 and are normalized such that the smallest of the three factors for each color temperature equals 1.

The last step in the generation of the look-up table 806 is the generation of the index to the table. Theoretically, this index is the blue/red ratio given by cor_fact_R/cor_fact_B. Practically, it is better to expand the range of the indices such that the used correction factors will be smaller than the theoretically estimated ones. This reduces the risk of overcompensation, which is visually unpleasant (e.g., it is better to keep a picture taken with incandescent light a little bit yellowish than taking the risk that it would become bluish). A way to generate expanded indexes with a small expansion factor of 1.1 is given by:

$$\text{index} = \left(\frac{\text{cor\_fact\_R}}{\text{cor\_fact\_B}} - \text{pivot}\right) * 1.1 + \text{pivot} \quad (17)$$

$$\text{pivot} = \frac{\text{cor\_fact\_R}}{\text{cor\_fact\_B}}\bigg|_{pivot\ illuminant}$$

Once the look-up table is stored, white balance correction using the online system follows the techniques described above. Raw image data is acquired by a sensor (e.g., sensor 1000) and converted to raw sensor data (e.g., by ADC 1060).

The raw sensor data may be pre-processed by an image pre-processing module 807 (e.g., processing device 1070 and/or by processing outside of image sensor 100) to generate raw sensor RGB data. The raw sensor RGB data may be sent to a white balance statistics module 808. White balance statistics module accesses reference illuminant data in look-up table 806, determines the "possibly white" points in the raw sensor RGB data and computes the weighted center of gravity (COG) of the raw sensor RGB data.

The weighted COG is passed to white balance coefficient module 809, which accesses look-up table 805 using the red/blue ratio of the weighted COG as described above. White balance coefficient module 809 may also be configured to interpolate between look-up table entries as described above. The correction coefficients are then passed to a white balance multiplier 810, where the raw sensor RGB data is multiplied by the correction coefficients to obtain white-balanced image data in the RGB color space of the image sensor. Finally, the white-balanced image data in the RGB color space of the image sensor is converted to the sRGB color space by inverse color matrix 811, which is the inverse of matrix M described above.

Figure 9:
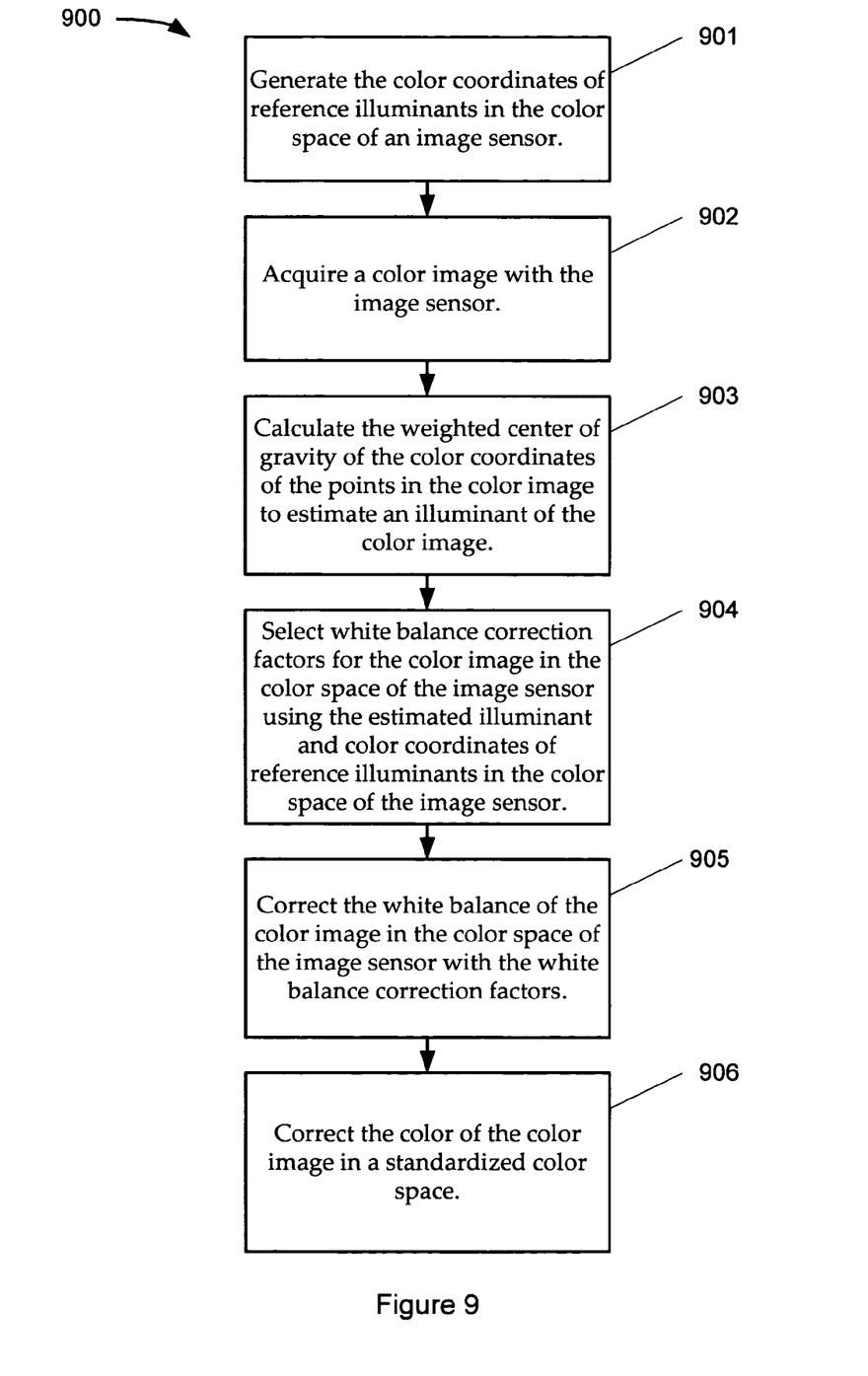
FIG. 9 is a flowchart illustrating a method for white balance correction in one embodiment.

FIG. 9 is a flowchart illustrating a method 900 for white balance correction using reference illuminants in one embodiment. The method begins by generating the color coordinates of reference illuminants in the color space of an image sensor (operation 901). The method continues by acquiring a color image with the image sensor (operation 902). The method calculates the weighted center of gravity of the color coordinates of the points in the color image, in the color space of the image sensor, to estimate an illuminant of the color image (operation 903). The method continues by selecting the white balance correction factors for the color image in the color space of the image sensor using the estimated illuminant and the color coordinates of reference illuminants in the color space of the image sensor (operation 904). Next, the white balance of the color image in the color space of the image sensor is corrected with the white balance correction factors (operation 905). Finally, the color of the color image is corrected to a standardized color space (operation 906).

While the present invention has been described with reference to specific exemplary embodiments, it will be understood that the invention is not limited to the embodiments described herein. A person of ordinary skill in the art would understand that the present invention may be practiced with modifications and/or alterations to those embodiments or can be practiced in other embodiments within the spirit and scope of the appended claims.

What is claimed is:
1. A method, comprising:
 calculating a weighted average of color coordinates of points in a color image to determine an estimated illuminant of the color image in a color space of an image sensor by determining possibly white points in the color image based on color balance of each point in the color image in the color space of the image sensor and not luminosity of the point, and giving greater weight to the possibly white points in the color image relative to other points in the color image; and
 selecting white balance correction factors for the color image using the estimated illuminant of the color image and color coordinates of one or more of a plurality of reference illuminant points in the color space of the image sensor, wherein selecting white balance correction factors comprises:

projecting the estimated illuminant of the color image of a line of the plurality of reference illuminant points in the color space of the image sensor, determining a reference illuminant point closest to the estimated illuminant of the color image; and selecting white balance correction factors using color coordinates of the closest reference illuminant point as an entry point to a lookup table that holds correction factors for each reference illuminant point.

2. The method of claim 1, further comprising correcting the white balance of the color image with the white balance correction factors to obtain a color corrected image in the color space of the image sensor.

3. The method of claim 2, wherein correcting the white balance of the color image comprises applying a correction factor to each point in the color image in each of the color coordinates of the color space of the image sensor.

4. The method of claim 2, further comprising applying luminance correction to the corrected color image in the color space of the image sensor to generate a corrected color image in a standardized color space.

5. The method of claim 1, wherein determining the possibly white points in the color image comprises:

calculating a distance between color coordinates of a point in the color image and color coordinates of the plurality of reference illuminant points; and designating the point as possibly white if the distance is less than a specified distance.

6. The method of claim 5, wherein selecting the white balance correction factors comprises determining a ratio of two colors in the estimated illuminant of the color image to provide an entry point to a lookup table, wherein the lookup table includes two-color ratios of the plurality of reference illuminant points and white balance correction factors corresponding to each of the plurality of reference illuminant points.

7. The method of claim 6, further comprising generating the white balance correction factors, wherein generating the white balance correction factors comprises:

illuminating a white reference image with each of a plurality of reference illuminants to generate the plurality of reference illuminant points in the color space of the image sensor; and determining factors to correct the color coordinates of the plurality of reference illuminant points in the color space of the image sensor to a white point in the color space of the image sensor in each of the color coordinates of the color space of the image sensor.

8. The method of claim 6, further comprising generating the white balance correction factors, wherein generating the white balance correction factors comprises:

illuminating a white reference image with a reference illuminant to generate a reference illuminant point in the color space of the image sensor; and calculating additional reference illuminant points in the color space of the image sensor using Planck's equation for black bodies of differing color temperatures.

9. An apparatus, comprising:

an image sensor to convert incident light from a color scene into a color image;

a processing device coupled with the color sensor, wherein the processing device is configured to:

determine possibly white points in the color image based on color balance of each point in the color image in a color space of the image sensor and not luminosity of the point;

assign greater weight to the possibly white points relative to other points in the color image to calculate a weighted average of color coordinates of points in the color image to determine an estimated illuminant of the color image in the color space of the image sensor;

select white balance correction factors for the color image using the estimated illuminant of the color image and color coordinates of one or more of a plurality of reference illuminant points in the color space of the image sensor, wherein to select the white balance correction factors, the processing device is configured to:

project the estimated illuminant of the color image on a line of the plurality of reference illuminant points in the color space of the image sensor; and select white balance correction factors for the color image using color coordinates of the closest reference illuminant point as an entry point to a lookup table that holds correction factors for each reference illuminant point.

10. The apparatus of claim 9, wherein the processing device is further configured to correct the white balance of the color image with the white balance correction factors to obtain a color corrected image in the color space of the image sensor.

11. The apparatus of claim 10, wherein to correct the white balance of the color image, the processing device is configured to apply a correction factor to each point in the color image in each of the color coordinates of the color space of the image sensor.

12. The apparatus of claim 10, wherein the processing device is further configured to apply luminance correction to the corrected color image in the color space of the image sensor to generate a corrected color image in a standardized color space.

13. The apparatus of claim 9, wherein to determine the possibly white points in the color image, the processing device is configured to:

calculate a distance between color coordinates of a point in the color image and the color coordinates of the plurality of reference illuminant points; and designate the point as possibly white if the distance is less than a specified distance.

14. The apparatus of claim 9, wherein to select the white balance correction factors, the processing device is configured to determine a ratio of two colors in the estimated illuminant of the color image to provide an entry point to a lookup table, wherein the lookup table includes two-color ratios of the plurality of reference illuminant points and white balance correction factors corresponding to each of the plurality of reference illuminant points.

15. The apparatus of claim 14, wherein the image sensor is configured to capture a white reference image illuminated with each of a plurality of reference illuminants, wherein the processing device is configured to generate the plurality of reference illuminant points in the color space of the image sensor, and to determine factors to correct the color coordinates of the plurality of reference illuminant points in the color space of the image sensor to a white point in the color space of the image sensor in each of the color coordinates of the color space of the image sensor.

16. The apparatus of claim 9, wherein the processing device is further configured to acquire the color image from the image sensor.

17. A method, comprising:

generating an illuminant calibration curve comprising a number of reference illuminant points in a color space of an image sensor;

capturing a color image with an image sensor;

calculating a weighted average of color coordinates of points in the color image by determining possibly white points in the color image based on color balance of each point in the color space of the image sensor and not intensity, and giving greater weight to the possibly white points in the color image relative to other points in the color image; and projecting the weighted average of color coordinates of points in the color image on the illuminant calibration curve and determining a reference illuminant point closest to the weighted average of color coordinates;

selecting white balance correction factors using color coordinates of the reference illuminant closest to the weighted average of color coordinates as an entry point to a lookup table storing correction factors for each reference illuminant point.

18. The method of claim 17, wherein determining possibly white points in the color image comprises:

calculating a distance between color coordinates of a point in the color image and color coordinates of the number of reference illuminant points; and designating the point as possibly white if the distance is less than a specified distance.

19. The method of claim 17, wherein generating an illuminant calibration curve comprises:

illuminating a white reference image with a reference illuminant to generate a reference illuminant point in the color space of the image sensor; and calculating additional reference illuminant points in the color space of the image sensor using Planck's equation for black bodies of differing color temperatures.

20. The method of claim 17, further comprising correcting the white balance of the color image by applying the white balance correction factors to each point in the color image.

* * * * *